US008882882B2

(12) United States Patent
Lee

(10) Patent No.: US 8,882,882 B2
(45) Date of Patent: Nov. 11, 2014

(54) METHOD OF MANUFACTURING FE AND NI CONTAINING MATERIAL AND COBALT CONTAINING MATERIAL USING RECYCLING RESIDUE OF SPENT CATALYST AND METHOD OF MANUFACTURING RAW MATERIAL FOR STAINLESS USING THE FE AND NI CONTAINING MATERIAL AND METHOD OF MANUFACTURING FE-NI ALLOY

(75) Inventor: Jae Young Lee, Pohang (KR)

(73) Assignee: Research Institute of Industrial Science & Technology, Pohang (KR)

( * ) Notice: Subject to any disclaimer, the term of this patent is extended or adjusted under 35 U.S.C. 154(b) by 576 days.

(21) Appl. No.: 12/674,984

(22) PCT Filed: Sep. 19, 2008

(86) PCT No.: PCT/KR2008/005548
§ 371 (c)(1),
(2), (4) Date: Feb. 24, 2010

(87) PCT Pub. No.: WO2009/038379
PCT Pub. Date: Mar. 26, 2009

(65) Prior Publication Data
US 2011/0107876 A1  May 12, 2011

(30) Foreign Application Priority Data

Sep. 21, 2007  (KR) ......................... 10-2007-0096915

(51) Int. Cl.
*B22F 9/22* (2006.01)
*C22B 23/02* (2006.01)
*C22B 7/00* (2006.01)

(52) U.S. Cl.
CPC ........... *C22B 23/026* (2013.01); *B22F 2999/00* (2013.01); *B22F 9/22* (2013.01); *C22B 23/023* (2013.01); *C22B 7/007* (2013.01); *C22B 23/021* (2013.01)
USPC ............................................. 75/710; 75/401

(58) Field of Classification Search
CPC ...... B22F 9/22; B22F 2999/00; C22B 23/021
USPC .................................................. 75/401, 710
See application file for complete search history.

(56) References Cited

U.S. PATENT DOCUMENTS

| 2,468,103 | A | * | 4/1949 | Pawel | 75/430 |
|---|---|---|---|---|---|
| 4,343,774 | A | * | 8/1982 | Tilley | 423/53 |
| 4,382,068 | A | * | 5/1983 | Rokukawa | 423/53 |
| 4,384,885 | A | * | 5/1983 | Muller et al. | 75/10.58 |
| 4,474,735 | A | * | 10/1984 | Rastas et al. | 423/53 |
| 4,721,606 | A | | 1/1988 | Tilley | |
| 2001/0047699 | A1 | * | 12/2001 | Hoffman et al. | 75/765 |
| 2005/0211020 | A1 | * | 9/2005 | Sugitatsu et al. | 75/484 |
| 2006/0024224 | A1 | * | 2/2006 | Neudorf et al. | 423/138 |
| 2010/0064854 | A1 | * | 3/2010 | Drinkard, Jr. | 75/430 |

FOREIGN PATENT DOCUMENTS

| JP | H03-226531 | 10/1991 | |
|---|---|---|---|
| JP | 05-125465 | 5/1993 | |
| JP | H05-156375 | 6/1993 | |
| JP | 2007-77459 | 3/2007 | |
| KR | 1998-0021919 | 1/2000 | |
| KR | 10-2006-0068387 | 6/2006 | |
| KR | 2007-0025283 | 4/2007 | |
| WO | WO 2006/089358 A1 * | 8/2006 | C22B 1/02 |

OTHER PUBLICATIONS

H. Remy, "Treatise on Inorganic Chemistry", 1956 (no month), Elsevier Publishing Co, vol. II, pp. 270-275.*
Genin et al.," Fougerite and Fe II-III hydroxycarbonate green rust; ordering, deprotonation and/or cation substitution; structure of hydrotalcite-like compounds and mythic ferrosc hydroxide Fe(OH) sub (2+x)", Apr. 2005, Solid State Sciences 7, pp. 545-572.*
S. R. Rao et al. , "Technical Note Ferrous-ferric oxidation in acidic mineral process effluents: comparison of methods", 1995 (no month), Minerals Engineering, vol. 8, No. 8, pp. 905-911.*
International Search Report for corresponding application No. PCT/KR2008/005548 dated Mar. 25, 2009.
Gaballah I. et al: "Recovery of Co, Ni, Mo, and V From Unroasted Spent Hydrorefining Catalysts by Selective Chlorination", Metallurgical and Materials Transactions A: Physical Metallurgy & Materials Science, ASM International, Materials Park, OH, US, vol. 26-B, No. 1, Feb. 1, 1995, pp. 41-50.
Supplementary European Search Report for corresponding application No. 08831849.8 dated May 11, 2012.
European Search Report for corresponding application No. EP13184128 dated Apr. 16, 2014.

* cited by examiner

*Primary Examiner* — Jie Yang
(74) *Attorney, Agent, or Firm* — Renner, Otto, Boisselle & Sklar, LLP

(57) ABSTRACT

Methods of manufacturing Fe and Ni-containing material and Co-containing material from petrochemical desulfurization residue containing Fe and Ni or Fe and Co, manufacturing raw material for stainless steel using the Fe and Ni-containing material, and manufacturing ferro-nickel using the Fe and Ni-containing material. The method of manufacturing Ni and Fe-containing material includes acid-treating Ni and Fe-containing residue to remove alkali therefrom; drying the residue and heat treating the residue in a temperature range from 600° C. (degree Centigrade) to 1300° C. (degree Centigrade) in a reducing atmosphere to reduce Ni and Fe oxides in the residue into metal state; leaching a resultant product obtained by the reduction using acid to selectively dissolve Ni and Fe; filtering the acid leached product to obtain a solution containing Ni and Fe ions; neutralizing the solution containing Ni and Fe ions using alkali to produce Fe,Ni hydroxide; and filtering and drying a resultant product obtained by the neutralization.

17 Claims, No Drawings

METHOD OF MANUFACTURING FE AND NI CONTAINING MATERIAL AND COBALT CONTAINING MATERIAL USING RECYCLING RESIDUE OF SPENT CATALYST AND METHOD OF MANUFACTURING RAW MATERIAL FOR STAINLESS USING THE FE AND NI CONTAINING MATERIAL AND METHOD OF MANUFACTURING FE-NI ALLOY

This application is a national phase of International Application No. PCT/KR2008/005548 filed Sep. 19, 2008 and published in the English language.

TECHNICAL FIELD

The present invention relates to a method of effectively recovering and recycling Ni, Fe and Co components from residue produced in a process of recycling petrochemical desulfurization catalyst, and more particularly, to a method of manufacturing re and Ni-containing material and Co-containing material from petrochemical desulfurization residue containing Fe and Ni or Fe and Co, a method of manufacturing raw material for stainless steel using the Fe and Ni-containing material, and a method of manufacturing ferro-nickel using the Fe and Ni-containing material.

BACKGROUND ART

Many countries are running facilities for recovering V and Mo from spent petrochemical desulfurization catalyst, which contains a large amount of V and Mo.

Generally, V and Mo are recovered by mixing spent desulfurization catalyst with sodium carbonate, desulfurizing the mixture by hot roasting in a rotary kiln, leaching V and Mo components in a water solution by water leaching of the mixture.

The spent petrochemical desulfurization catalyst contains not only the V and Mo components but also Ni, Fe and Co components, which form spinel phases such as $NiOAl_2O_3$, $FeOAl_2O_3$ and $CoOAl_2O_3$ by the hot roasting. Here, since the spinel phases are not leached by water leaching, residue is formed.

When an oil refining company uses a Ni-containing catalyst, spent catalyst residue containing Ni and Fe is produced. When Co-containing catalyst is used, spent catalyst residue containing Co and Fe is produced.

Since Ni, Fe and Co components in the spent catalyst residue are of a spinel phase, which is chemically stable, they have been buried without being recovered.

According to a method of recovering Ni from the spent chemical desulfurization catalyst, Ni is recovered in the form of $NiSO_4$ by cold roasting (Korean Patent Application No. 1998-0021919).

The Ni-recovering method separates and recovers Ni component in the form of $NiSO_4$ from spent petroleum desulfurization catalyst by oxidizing roasting, ammonium sulfate leaching, solvent extraction and crystallization.

However, this method has to use two roasting steps, expensive leaching agent and solvent extracting agent and is expensive to separate and remove iron. Therefore, the application of this method is restricted.

In addition, there is proposed a method of recovering V and Mo from catalyst using alkali processing of the catalyst, Ni processing in the form of NiO and wet treatment (Korean Patent Application No. 2007-0025283).

This method, however, is not economic since the degree of Ni recovery is very low (57%) and a large amount of expensive alkali agent such as sodium hydroxide has to be used.

Accordingly, up to present, after V and Mo are recovered from the spent petroleum desulfurization catalyst, the entire amount of residue has been buried in most cases.

DISCLOSURE OF INVENTION

Technical Problem

The present invention has been made to solve the foregoing problems with the prior art, and one or more aspects of the invention provide a method of manufacturing Fe and Ni-containing material by recovering Ni and Fe from Ni and Fe-containing residue, which remains after V and Mo are recovered from spent petroleum desulfurization catalyst.

One or more aspects of the invention provide a method of manufacturing raw material for stainless steel using the Fe and Ni-containing material produced by recovering Ni and Fe from Ni and Fe-containing residue, which remains after V and Mo are recovered from spent petroleum desulfurization catalyst.

One or more aspects of the invention provide a method of manufacturing ferro-nickel using the Fe and Ni-containing material produced by recovering Ni and Fe from Ni and Fe-containing residue, which remains after V and Mo are recovered from spent petroleum desulfurization catalyst.

One or more aspects of the invention provide a method of manufacturing Co-containing material by recovering Co from Fe and Co-containing residue, which remains after V and Mo are recovered from spent petroleum desulfurization catalyst.

Technical Solution

Hereinafter the present invention will be described.

The invention provides a method of manufacturing Ni and Fe-containing material from recycling residue of spent petrochemical desulfurization catalyst and a method of manufacturing Co-containing material from recycling residue of spent petrochemical desulfurization catalyst.

The method of manufacturing Ni and Fe-containing material may include treating Ni and Fe-containing residue with acid to remove alkali element therefrom, the residue remaining after V and Mo are recovered from spent petrochemical desulfurization catalyst; drying the residue from which the alkali element is removed and heat treating the residue in a temperature range from 600° C. (degree Centigrade) to 1300° C. (degree Centigrade) in a reducing atmosphere to reduce Ni and Fe oxides in the residue into metal; leaching a resultant product obtained by the reduction using acid to selectively dissolve Ni and Fe; and filtering the acid leached product to obtain a solution containing Ni and Fe ions. The method of manufacturing Ni and Fe-containing material may further include neutralizing the solution containing Ni and Fe ions using alkali to produce Fe,Ni hydroxide; and filtering and drying a resultant product obtained by the neutralization to produce Ni and Fe-containing material.

The method of manufacturing Co-containing material may include treating Fe and Co-containing residue with acid to remove alkali element therefrom, the residue remaining after V and Mo are recovered from spent petrochemical desulfurization catalyst; drying the residue from which the alkali element is removed and heat treating the residue in a temperature range from 600° C. (degree Centigrade) to 1300° C.

(degree Centigrade) in a reducing atmosphere to reduce Fe and Co oxides in the residue into metal state; leaching a resultant product obtained by the reduction with acid to selectively dissolve Fe and Co; and filtering the acid leached product to obtain a solution containing Fe and Co ions.

The method of manufacturing Co-containing material may further include blowing an oxidizing gas or adding hydrogen peroxide to the solution containing Fe and Co ions to convert the Fe ions into $Fe^{+3}$ ions, causing a reaction at pH ranging from 2.5 to 4.5 to produce ferric hydroxide, filtering the ferric hydroxide to remove Fe, and adding an alkali component, thereby producing Co compound.

The invention also provides a method of manufacturing raw material for stainless steel, which may include adding cement as a binder to the Fe and Ni-containing material, produced by the method manufacturing Ni and Fe-containing material from recycling residue of spent petrochemical desulfurization catalyst, and then adding water to the cement-added material to form the water-added material; and drying the formed material to cure the cement.

The invention also provides a method of manufacturing ferro-nickel by heat treating the Fe and Ni-containing material, produced by the method manufacturing Ni and Fe-containing material from recycling residue of spent petrochemical desulfurization catalyst, in a temperature ranging from 600° C. (degree Centigrade) to 1300° C. (degree Centigrade) in a reducing atmosphere.

Advantageous Effects

As set forth above, the invention can most effectively recover Ni and Co from spent desulfurization catalyst residue, and thus be properly applied to the field in which Ni and Co-containing by-products are recycled.

BEST MODE FOR CARRYING OUT THE INVENTION

Hereinafter the present invention will be described in detail.

First, a description will be made of a method of manufacturing Fe and Ni-containing material or Fe and Co-containing material from recycling residue of spent petroleum desulfurization catalyst.

In order to manufacture the Fe and Ni-containing material or the Fe and Co-containing material from the recycling residue of spent petroleum desulfurization catalyst according to the invention, Ni and Fe-containing residue or Fe and Co-containing residue remaining after recovering V and Mo from spent petrochemical desulfurization catalyst is treated with acid to remove alkali element from the residue.

The inventors have found that the composition of the residue affects the purity of a final product.

Hence, a preliminary treatment of processing impurities from the spent catalyst residue before a main treatment is required in order to realize the purpose of the invention irrespective of the composition of the spent catalyst residue.

The spent catalyst residue contains Na impurity originating from sodium carbonate and Ca impurity from a spent catalyst.

The Na and Ca impurities in the residue exist in the form of $Na_2OSiO_2$ and $CaOAl_2O_3$.

When the residue containing a large amount of the Na and Ca impurities is reduced and then is leached with acid, Na and Ca components are dissolved by acid and a large amount of Si and Al components are mixed. Then, a large amount of Si, Al and Ca impurities are mixed into Fe—Ni hydroxide, which is neutralized after being leached, thereby greatly decreasing the purity of Fe, Ni and Co.

Accordingly, impurities in the residue such as $Na_2OSiO_2$ and $CaOAl_2O_3$ have to be treated with acid so as to dissolve and remove Na, Ca, Al, Si and so on.

The acid for removing alkali elements in the residue may include but is not particularly limited to, at least one or two selected from the acid group consisting of hydrochloric acid, sulfuric acid, nitric acid and fluoric acid.

In the acid treatment, the alkali elements can be removed by preferably setting reaction pH in the range from 0.25 to 7.5 so that the content of Na+Ca components in the residue becomes 4% or less. This as a result can increase Ni or Co concentration of a final product.

Then, the residue from which the alkali elements are removed are dried, followed by heat treatment at a temperature ranging from 600° C. (degree Centigrade) to 1300° C. (degree Centigrade) in a reducing atmosphere, to thereby reduce oxides in the residue into metal state Ni and Fe or Fe and Co.

Since the Ni, Fe and Co components in the residue exist as chemically-stable spinel phases ($NiOAl_2O_3$, $FeOAl_2O_3$ and $CoOAl_2O_3$), they are rarely dissolved by a general wet leaching. To this end a special leaching agent having high concentration can be used. However, a large amount of Al component will be dissolved in addition to the Ni, Fe and Co components, thereby decreasing the purity of the Ni, Fe and Co components recovered.

In contrast, when the residue containing the Ni and Fe components and the residue containing the Fe and Co components are heat treated in a reducing atmosphere of a reducing agent such as hydrogen gas ($H_2$), a reducing reaction as expressed in Formula 1 occurs so that Ni, Fe and Co are reduced into metal state.

$$NiOAl_2O_3 + H_2 = Ni + Al_2O_3 + H_2O$$

$$FeOAl_2O_3 + H_2 = Fe + Al_2O_3 + H_2O$$

$$CoOAl_2O_3 + H = Co + Al_2O_3 + H_2O \quad \text{[Formula 1]}$$

Fe, Ni and Co reduced as above are easily dissolved by reaction with acid such as hydrochloric acid, sulfuric acid and nitric acid, but $Al_2O_3$ is not easily dissolved by acid due to its great acid resistance.

Hence, the reduced products are dissolved with acid, the reduced metal components such as Ni, Fe and Co can be selectively dissolved thereby forming ions.

At a heat treatment temperature under 600° C. (degree Centigrade) in the reducing heat treatment, Ni, Fe and Co are not sufficiently reduced. Even if the Ni, Fe and Co components are leached with acid in the next process, they are rarely selectively dissolved by acid.

In contrast, when the heat treatment temperature exceeds 1300° C. (degree Centigrade), reduced Ni, Fe and Co may be subjected to rapid fuse-sintering. This is not preferable since the reduced Ni, Fe and Co may stick to a reducing pot or facility.

While Formula 1 represents the result of reduction using $H_2$ as a reducing agent, this is not intended to limit the present invention. Rather, the reducing agent for reducing Fe, Ni and Co may include a single gas of $H_2$ and carbon monoxide or a mixture gas thereof. The mixture gas ($H_2+CO$) may include reformed LNG (Liquefied Natural Gas) or LPG (Liquefied Propane Gas).

Alternatively, solid state reduction can be enabled by adding C component into the residue containing the Ni and Fe components or the residue containing the Fe and Co components.

Next, the reduced product obtained as above is leached with acid to selectively dissolve Ni, Fe and Co.

The acid may include but is not particularly limited to, at least one selected from the acid group consisting of hydrochloric acid, sulfuric acid, nitric acid and fluoric acid.

In particular, when the reduced product contains Ni, the leaching can be carried out using waste acid containing Ni component so as to additionally recover Ni ions existing in the waste acid along with the Ni component. Thus, the Ni-containing waste acid can be preferably used.

The Ni-containing waste acid may include waste acid, which is produced as by-products in stainless steel pickling. Examples of this waste acid may include waste sulfuric acid (e.g., 20% sulfuric acid, Ni=0.25%) and waste mixed acid (e.g., a mixed solution of nitric acid and fluoric acid, Ni=0.5%). The amount of Ni recovery can be greatly increased using this waste acid.

In the acid leaching above, it is preferable to control pH in the range from 0 to 4.

Then, the resultant solution obtained by the above acid leaching is filtered to produce a solution containing leached Ni and Fe ions or a solution containing leached Fe and Co ions.

Next, the filtered Ni and Fe-containing solution is neutralized with alkali to produce Fe,Ni hydroxide, which is in turn filtered and dried to produce Ni and Fe-containing material.

In other words, a neutralizer is added into the filtered Ni and Fe-containing solution so as to precipitate Fe and Ni into hydroxide $(Ni,Fe)(OH)_2$ as expressed in Formula 2 below.

$(Fe,Ni)SO_4 + 2NaOH = (FeNi)(OH)_2 + Na_2SO_4$ (water soluble)

$(Fe,Ni)Cl_2 + Ca(OH)_2 = (FeNi)(OH)_2 + CaCl_2$ (water soluble)  [Formula 2]

The neutralizer used to produce the Fe,Ni hydroxide may include, but is not particularly limited to, least one selected from the neutralizer group consisting of NaOH, KOH, $Ca(OH)_2$ and $NH_4OH$.

Here, the neutralizer and the leaching acid have to be selected to form a combination that allows Fe and Ni ions to precipitate into hydroxide but alkali metal ions to form water soluble salt.

When calcium hydroxide neutralizer is applied to sulfuric acid Fe,Ni salt solution produced by sulfuric acid leaching as expressed in Formula 3 below, even neutral salt $CaSO_4$ precipitates and thus cannot be filtered from Fe—Ni hydroxide. Then, the purity of Fe,Ni hydroxide becomes too low to be used.

$(Fe,Ni)SO_4 + Ca(OH)_2 = (FeNi)(OH)_2 + CaSO$ (precipitatable)  [Formula 3]

When the Fe,Ni precipitates are reacted by blowing air or oxygen, Ni—Fe ferrite is formed as expressed in Formula 4 below, thereby producing black precipitates. In the invention, the Fe and Ni-containing material can exist in the form or Fe—Ni hydroxide or Fe—Ni ferrite.

$(FeNi)(OH)_2 + O_2 = (FeNi)O.Fe_2O_3$ (Fe—Ni ferrite)  [Formula 4]

Below, a description will be given of a method of manufacturing raw material for stainless steel and a method of manufacturing ferro-nickel using the Fe and Ni-containing material produced as above.

For being used as a raw material for manufacturing stainless steel, the material has to be agglomerated since it will be discharged as dust when charged into a furnace.

In other words, cement is added as binder and then water is added to the above-described mixture. The resultant product is formed and is dried to cure the cement, thereby producing agglomerated Fe and Ni-containing material for manufacturing stainless steel material.

In addition, a reducing agent such as C and Al can be mixed into the formed product to facilitate reduction.

Further, the Ni and Fe-containing material $(FeNi)(OH)_2$ or $(FeNi)O.Fe_2O_3$ can be manufactured into Fe—Ni alloy or ferro-nickel by heat treating in a hydrogen atmosphere or with a reducing agent mixed.

Most of spent catalyst residue produced from oil refining companies contains Ni and Fe because the oil refining companies use Ni-containing catalyst.

Since some oil refining companies use Co-containing catalyst, Co and Fe-containing spent catalyst residue is also produced.

Fe component contained in the spent catalyst residue originates from the Fe component in crude oil, which deposits to the spent catalyst.

Also in the case of the Co-containing spent catalyst residue, Co and Fe components can be extracted in the form of solution by impurity treatment, reduction heat treatment and acid leaching.

It is preferable to separate Fe from Co compound. Fe can be removed by converting Fe ions into $F^{+3}$ ions by blowing oxidizing gas or adding hydrogen peroxide into this solution and reacting at pH=2.5-4.5. In this way, Co single ions can be produced.

Then, Co compound is produced by adding alkali component to the solution from which Fe is removed as above.

The alkali component may include with $Na_2CO_3$ (sodium carbonate), NaOH (sodium hydroxide), etc. When $Na_2CO_3$ is used as the alkali component, cobalt carbonate is produced as the Co compound. When a hydroxyl-containing material such as NaOH is used as the alkali component, cobalt hydroxide is produced as the Co compound.

Hereinafter, the present invention will be described in more detail with respect to Examples.

Example 1

While residues spent of desulfurization catalyst, from which V and Mo are recovered, have different compositions according oil refining companies, the spent catalyst and V and Mo-recovering processes, a typical average composition is as reported in Table 1 below.

TABLE 1

| | Component | | | | | | |
|---|---|---|---|---|---|---|---|
| | Fe | Ni | V | Al | Si | Na | Ca |
| Content (wt %) | 5.19 | 2.55 | 1.68 | 25.49 | 4.05 | 7.68 | 0.80 |

For the purpose of preliminary impurity treatment of spent catalyst residue, spent desulfurization catalyst residues of 100 g were dissolved into a water solution of 500 ml, followed by acid treatment using different sorts of acids (hydrochloric acid and sulfuric acid) and different pH. The resultant products were filtered and dried, weighed and wet-analyzed to obtain Ni loss rates, which are reported in Table 2 below. Here, Ni loss rate=[{(amount of Ni in residue before acid treatment−amount of Ni in residue after acid treatment)}/(amount of Ni in residue before acid treatment)]×100.

In addition, removing effects were analyzed by measuring Na, Ca, Al and Si concentrations according to acid treatment, and the results are reported in Table 2 below.

TABLE 2

| Sample | Impurity treatment (acid) | Acid treatment (pH) | Ni loss (%) | Constituent analysis of residue after acid treatment (wt %) | | | |
|---|---|---|---|---|---|---|---|
| | | | | Si | Al | Na | Ca |
| 1 | — | 9.6 | 0% | 4.0 | 25.4 | 7.2 | 0.7 |
| 2 | hydrochloric acid | 7.9 | 0.11% | 3.3 | 24.5 | 4.5 | 0.6 |
| 3 | hydrochloric acid | 6.7 | 0.12% | 2.9 | 23.3 | 3.4 | 0.6 |
| 4 | hydrochloric acid | 4.0 | 0.13% | 2.8 | 24.1 | 2.8 | 0.4 |
| 5 | hydrochloric acid | 2.5 | 0.48% | 2.4 | 23.8 | 1.1 | 0.3 |
| 6 | hydrochloric acid | 0.5 | 0.92% | 2.5 | 24.1 | 0.5 | 0.2 |
| 7 | hydrochloric acid | 0.2 | 5.6% | 1.0 | 24.3 | 0.4 | 0.2 |
| 8 | sulfuric acid | 4.0 | 0.21% | 0.3 | 24.3 | 2.7 | 0.5 |
| 9 | nitric acid | 4.0 | 0.25% | 2.0 | 24.2 | 2.5 | 0.4 |
| 10 | fluoric acid + nitric acid | 4.0 | 0.15% | 0.5 | 23.5 | 3.6 | 0.6 |

As reported in Table 2 above, in the case of water washing (Sample 1) or in the case where acid treatment pH exceeds 7.5 (Sample 2), Na and Ca were removed at only a slight amount compared to the material. This had a serious adverse effect on the purity of Fe,Ni products since the remaining Na and Ca serve as impurities.

In contrast, Na and Ca-removing effects were apparent in the case of acid treatment at pH=0.25 to 7.5 (Samples 3 to 6 and 8 to 10).

When acid treatment pH is under 0.25 as in Sample 7, Ni loss occurs since part of spinel phase Ni dissolves.

When acid treatment pH is excessively low, an excessive amount of Si and Al dissolves so as to disadvantageously increase a great amount of secondary sludge for treating acid treatment waste liquid.

As seen from Samples 8 to 10, when acid treatment was carried out using at least one selected from the acid group consisting of nitric acid, sulfuric acid and fluoric acid in place of hydrochloric acid, similar effects were obtained.

Example 2

Samples were manufactured by drying the residues obtained through the impurity treatment in Example 1 and then heat treating the dried residues at a temperature from 550° C. (degree Centigrade) to 1350° C. (degree Centigrade) in a reducing hydrogen atmosphere, or mixing a carbon reducing agent (cokes) into the dried residues and heat treating the residues at a temperature from 950° C. (degree Centigrade) to 1350° C. (degree Centigrade) so that metal is reduced from Ni and Fe oxides in the residues.

Then, the reduced products obtained above were leached for 1 to 3 hours with hydrochloric acid, sulfuric acid and Ni-containing waste acid, Fe and Ni are selectively dissolved with free acid being extinguishing, which leads to an increase in pH of the solution.

Finishing pH related to reaction rate can also be varied according to the dose of hydrochloric acid.

Solutions were prepared using different pHs at the point where the leaching stops by varying the dose of hydrochloric acid.

To the leached solutions containing Fe and Ni ions, different types of neutralizes such as $Ca(OH)_2$ and NaOH were added to neutralize the solutions to a neutralization equivalence point where pH=10.0, thereby producing Fe—Ni hydroxides.

The Fe—Ni hydroxides were filtered and washed.

The Fe—Ni hydroxides were then dried to measure their weights, and Fe and Ni components were analyzed using an Energy Dispersive Spectroscopy (EDX) to obtain Ni+Fe contents.

Based on the Ni content analysis and sample weight analysis, the degrees of Ni recovery obtained from the residues were examined. Here, the degree of Ni recovery=[{(amount of Ni in Fe—Ni hydroxide)}/(amount of Ni in reduced sample)]×100.

The results such as the degrees of Ni recover/and problems according to experimental conditions are summarized in Table 3 below.

TABLE 3

| Sample | Reducing agent/temp (° C.) | Leaching acid | Leaching pH | Neutralizer | Degree of Ni recovery | Ni + Fe content (%) | Remarks |
|---|---|---|---|---|---|---|---|
| 11 | H/550 | HA[1] | −0.3 | NaOH | 15% | 35 | Not reduced, Not leached |
| 12 | H/750 | HA | 0.4 | NaOH | 85% | 46 | — |
| 13 | H/950 | HA | 0.8 | NaOH | 93% | 48 | — |
| 14 | H/1150 | HA | 0.9 | NaOH | 54% | 49 | — |
| 15 | H/1350 | HA | 0.8 | NaOH | — | — | Fuse sintering |
| 16 | C/950 | HA | 0.6 | NaOH | 88% | 52 | — |
| 17 | C/1150 | HA | 0.9 | NaOH | 95% | 51 | — |
| 18 | C/1350 | HA | 1.1 | NaOH | — | — | Fuse sintering |
| 19 | H/850 | SA[2] | 1.1 | NaOH | 96% | 51 | — |
| 20 | H/850 | SA | 1.2 | $Ca(OH)_2$ | 97% | 33 | Gypsum formed |
| 21 | H/850 | HA | 1.2 | $Ca(OH)_2$ | 96% | 52 | — |
| 22 | H/850 | SSA[3] | 0.6 | NaOH | 105% | 49 | — |
| 23 | H/850 | MA[4] | 0.9 | NaOH | 111% | 46 | — |
| 24 | H/850 | HA | −0.2 | NaOH | 97% | 39 | Chlorine gas formed, Large amount of neutralizer mixed |
| 25 | H/850 | HA | 2.8 | NaOH | 91% | 46 | — |

TABLE 3-continued

| Sample | Reducing agent/ temp (° C.) | Leaching acid | Leaching pH | Neutralizer | Degree of Ni recovery | Ni + Fe content (%) | Remarks |
|---|---|---|---|---|---|---|---|
| 26 | H/850 | HA | 5.7 | NaOH | 64% | 47 | Ni loss, Long leaching time (10 hrs) |

Note)
HA[1]: hydrochloric acid,
SA[2]: sulfuric acid,
SSA[3]: stainless steel pickling waste sulfuric acid,
MA[4]: stainless steel pickling waste mixed acid As seen from Table 3 above, it is apparent that both H and C can be used as a reducing agent of Fe and Ni.

At a reducing temperature not exceeding 600° C. (degree Centigrade), Fe and Ni did not exist in the form of metal since reducing reaction was not sufficient, and the pH of leaching solution did not increase over 0 since leaching reaction rarely took place. As a result, a small amount of Fe—Ni hydroxide was recovered and thus the degree of Ni recovery was poor (Sample 11).

In case of reduction into Fe and Ni metals, the following leaching reaction became easier. As a result, the degrees of Ni recovery were close to 100% with the minimum degree of recovery 85% (Samples 12 to 14, 16, 17, 19, 21 to 23 and 25).

When the reducing temperature was too high, reduced Fe and Ni were subjected to rapid melting and sintering and were welded to a reducing agent container (made of stainless steel, alumina). As a result, samples could not be produced and the degrees of Ni recovery could not be calculated (Samples 15 and 18).

Since the melting as above makes it difficult to carry the following wet treatment, the reducing temperature is set preferably 1300° C. (degree Centigrade) or less.

The Ni and Fe components can be selected leached by leaching the reduced products with at least one acid selected from the acid group consisting of hydrochloric acid, sulfuric acid, nitric acid and fluoric acid.

Here, Ni-containing waste acid can be preferably used since not only the Ni component in the spent catalyst residue but also Ni ions in the waste acid can be recovered. Examples of the Ni-containing waste acid may include waste sulfuric acid (20% sulfuric acid, Ni=0.25%) and waste mixed acid (mixed solution of nitric acid and fluoric acid, Ni=0.5%) produced in a stainless steel pickling process. When the Ni waste acid was used in the leaching, the degree of Ni recovery was greatly increased and could be increased theoretically to 100% or more (Samples 22 and 23).

When the reduced products were leached with hydrochloric acid, sulfuric acid and Ni-containing waste acid for 1 to 3 hours, Fe and Ni were selectively dissolved into ions with free acid being extinguishing, which leads to an increase in pH of the solution (Samples 11, 12 and 13). Final pH is related to reaction rate and can also be varied according to the dose of hydrochloric acid.

When the dose of hydrochloric acid used in the leaching is greater than the theoretic value, a large amount of acid remains after the leaching reaction. This increases the amount of neutralizer to be added and the amount of leaching acid components such as chlorine and sulfuric acid to be mixed into the product to thereby cause toxic gas. Accordingly, leaching pH is preferably in the range from 0 to 4. The remaining acidity lowers when leaching pH is too low (Sample 24), and reaction time increases, and the degrees of Ni recovery is low due to the presence of deposited Ni when leaching pH is too high (Sample 26).

Example 3

The Fe—Ni hydroxides manufactured in Example 2 were dried, were mixed with a cement-based binder and cokes, and then were formed (agglomerated) through pelletizing, briquetting and so on, thereby producing ferro-nickel material for manufacturing stainless steel.

Then, metal ferro-nickel pellets and briquettes can be produced by reducing the Fe and Ni-containing pellets and briquettes to which the cement binder and the cokes mixed through heat treatment at 600° C. (degree Centigrade) to 1300° C. (degree Centigrade), which is a reducing temperature examined in Example 2.

In addition, Fe—Ni alloy powder can be produced by heat treating the Fe—Ni hydroxide, produced in Example 2, in a hydrogen atmosphere.

Example 4

While Co and Fe-containing residues of spent desulfurization catalyst, from which V and Mo are recovered, have different compositions according oil refining companies, the spent catalyst and V and Mo-recovering processes, a typical average composition thereof is as reported in Table 4 below.

TABLE 4

| | Component | | | | | | |
|---|---|---|---|---|---|---|---|
| | Fe | Co | V | Al | Si | Na | Ca |
| Content (wt %) | 1.19 | 1.35 | 1.48 | 30.4 | 5.05 | 3.68 | 0.80 |

When the spent catalyst residue 100 g was treated with hydrochloric acid to the point of pH=3.5, followed by filtered washing, Fe and Co components showed substantially no changes, but Na, Ca and trace P components decrease in a large amount. When the pickled residue was reduced using hydrogen at 850° C. (degree Centigrade), Co and Fe components were reduced into metal state. The resultant product was treated with hydrochloric acid thereby dissolving Co and Fe into a solution.

Hydrogen peroxide was added to the solution containing Fe and Co ions to convert the Fe ions into $Fe^{+3}$ ions, causing a reaction at pH ranging from 2.5 to 4.5 to produce ferric hydroxide, which was in turn filtered to remove the Fe component.

When sodium carbonate and sodium hydroxide were added to the Co solution, from which the Fe component was removed, blue precipitates were produced. When the precipitates were dried and inspected via X-Ray Diffraction (XRD), they were identified as cobalt carbonate and cobalt hydroxide.

The invention claimed is:

1. A method of manufacturing Ni and Fe-containing material from recycling residue of spent petrochemical desulfurization catalyst, comprising:
    providing the spent petrochemical desulfurization catalyst comprising V, Mo, Ni and Fe components;
    mixing the spent petrochemical desulfurization catalyst with sodium carbonate;
    desulfurizing the mixture by hot roasting;
    leaching V and Mo in a water solution;
    treating the water solution with acid to remove Na and Ca impurities therefrom;
    drying the residue from which the Na and Ca impurities have been removed and heat treating the residue in a temperature range from 600° C. (degree Centigrade) to 1300° C. (degree Centigrade) in a reducing atmosphere to reduce Ni and Fe oxides existing as spinel phases, $NiOAl_2O_3$ and $FeOAl_2O_3$, in the residue into metal state;
    leaching, with acid, a resultant product obtained by the reduction to selectively dissolve Ni and Fe;
    filtering the acid leached product to obtain a solution containing Ni and Fe ions;
    neutralizing the solution containing Ni and Fe ions with alkali to produce Fe,Ni hydroxide; and
    filtering and drying a resultant product obtained by the neutralization to produce a Ni and Fe-containing material.

2. The method of claim 1, wherein the acid for removing the Na and Ca impurities from the residue is at least one selected from an acid group consisting of hydrochloric acid, sulfuric acid, nitric acid and hydrofluoric acid, and wherein pH in the treatment with the acid ranges from 0.25 to 7.5 to remove the Na and Ca impurities such that content of Na+Ca components in the residue becomes 4% or less.

3. The method of claim 1, wherein the reducing atmosphere comprises a single gas of hydrogen and carbon monoxide or a mixture gas thereof.

4. The method of claim 3, wherein the mixture gas is reformed liquefied natural gas (LNG) or reformed liquefied propane gas (LPG).

5. The method of claim 1, wherein the acid used in the leaching to dissolve Ni and Fe is at least one selected from an acid group consisting of hydrochloric acid, sulfuric acid, nitric acid and hydrofluoric acid.

6. The method of claim 1, wherein the acid used in the leaching to dissolve Ni and Fe comprises stainless steel pickling waste acid containing Ni.

7. The method of claim 1, wherein the acid used in the leaching to dissolve Ni and Fe has leaching pH ranging from 0 to 4.

8. The method of claim 1, wherein a neutralizer for producing the Fe—Ni hydroxide from the solution containing Ni and Fe ions is at least one selected from a neutralizer group consisting of NaOH, KOH, $Ca(OH)_2$ and $NH_4OH$.

9. The method of claim 1, wherein the kinds of the neutralizer and the leaching acid are selected to form a combination that allows Fe and Ni ions to precipitate into hydroxide but alkali metal ions to form water soluble salt.

10. A method of manufacturing raw material for stainless steel, comprising:
    adding cement as a binder to the Fe and Ni-containing material, produced by the method as described in claim 1, and then adding water to the cement-added material to form the water-added material; and
    drying the formed material to cure the cement.

11. A method of manufacturing ferro-nickel by heat treating the Fe and Ni-containing material, produced by the method as described in claim 1, in a temperature ranging from 600° C. (degree Centigrade) to 1300° C. (degree Centigrade) in a reducing atmosphere.

12. A method of manufacturing Co-containing material from recycling residue of spent petrochemical desulfurization catalyst, comprising:
    providing the spent petrochemical desulfurization catalyst comprising V, Mo, Co and Fe components;
    mixing the spent petrochemical desulfurization catalyst with sodium carbonate;
    desulfurizing the mixture by hot roasting;
    leaching V and Mo in a water solution;
    treating the water solution with acid to remove Na and Ca impurities therefrom;
    drying the residue from which the Na and Ca impurities are removed and heat treating the residue in a temperature range from 600° C. (degree Centigrade) to 1300° C. (degree Centigrade) in a reducing atmosphere to reduce Fe and Co oxides existing as spinel phases, $CoOAl_2O_3$ and $FeOAl_2O_3$, in the residue into metal state;
    leaching, with acid, a resultant product obtained by the reduction to selectively dissolve Fe and Co;
    filtering the acid leached product to obtain a solution containing Fe and Co ions; and
    blowing an oxidizing gas or adding hydrogen peroxide to the solution containing Fe and Co ions to convert the Fe ions into $Fe^{+3}$ ions, causing a reaction at pH ranging from 2.5 to 4.5 to produce $FeO(OH)$ or $Fe(OH)_3$, filtering the solution to remove iron as $FeO((OH)$ or $FE(OH)_3$, and adding an alkali component, thereby producing Co compound.

13. The method of claim 12, wherein the acid for removing the Na and Ca impurities from the residue is at least one selected from an acid group consisting of hydrochloric acid, sulfuric acid, nitric acid and fluoric acid, and wherein pH in the treatment with the acid ranges from 0.25 to 7.5 to remove the Na and Ca impurities such that content of Na+Ca components in the residue becomes 4% or less.

14. The method of claim 12, wherein the reducing atmosphere comprises a single gas of hydrogen and carbon monoxide or a mixture gas thereof.

15. The method of claim 14, wherein the mixture gas is reformed liquefied natural gas (LNG) or reformed liquefied propane gas (LPG).

16. The method of claim 12, wherein the acid used in the leaching to dissolve Co and Fe is at least one selected from an acid group consisting of hydrochloric acid, sulfuric acid, nitric acid and fluoric acid.

17. The method of claim 12, wherein the Co compound is cobalt carbonate or cobalt hydroxide.

* * * * *